Patented Apr. 5, 1932

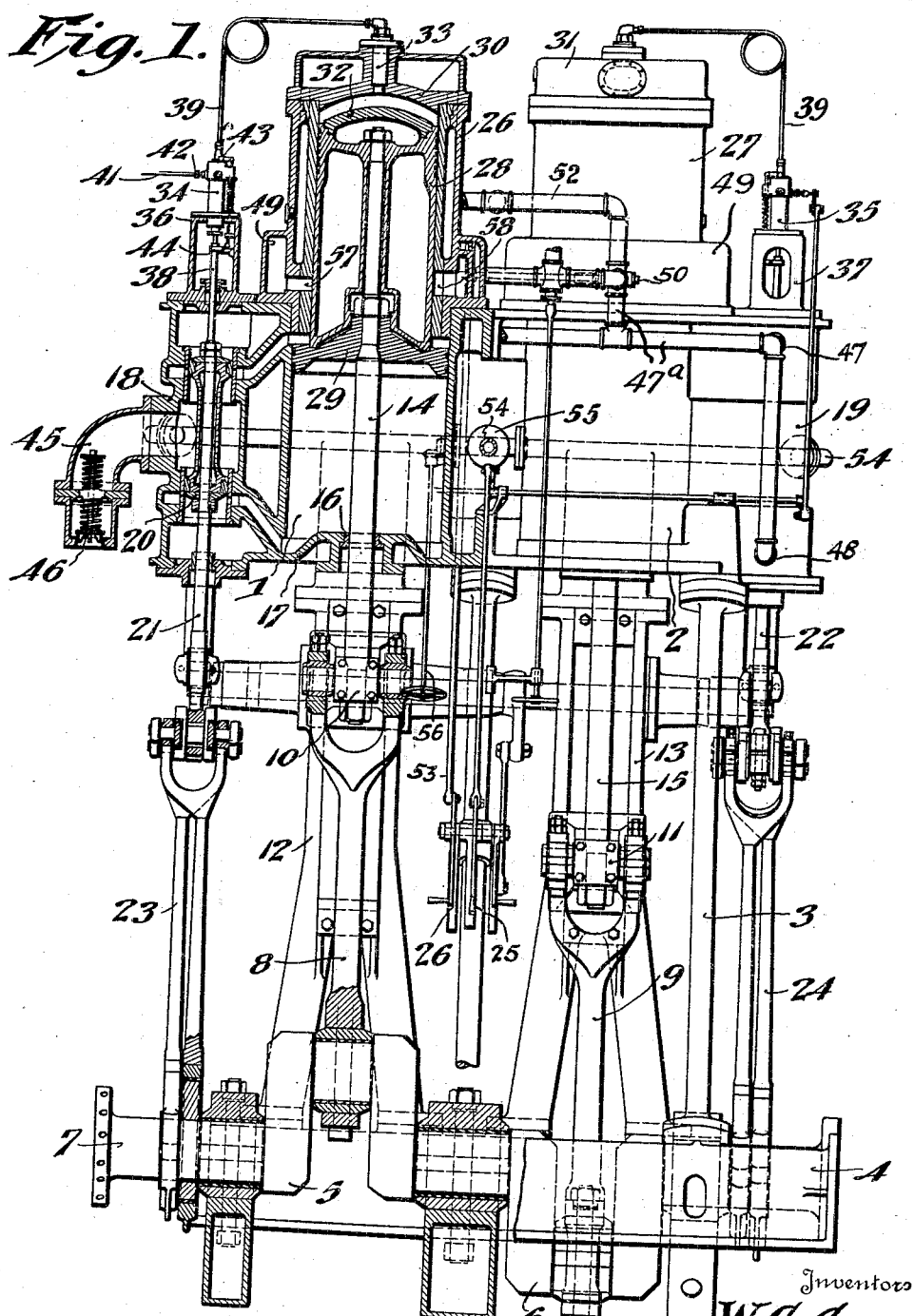

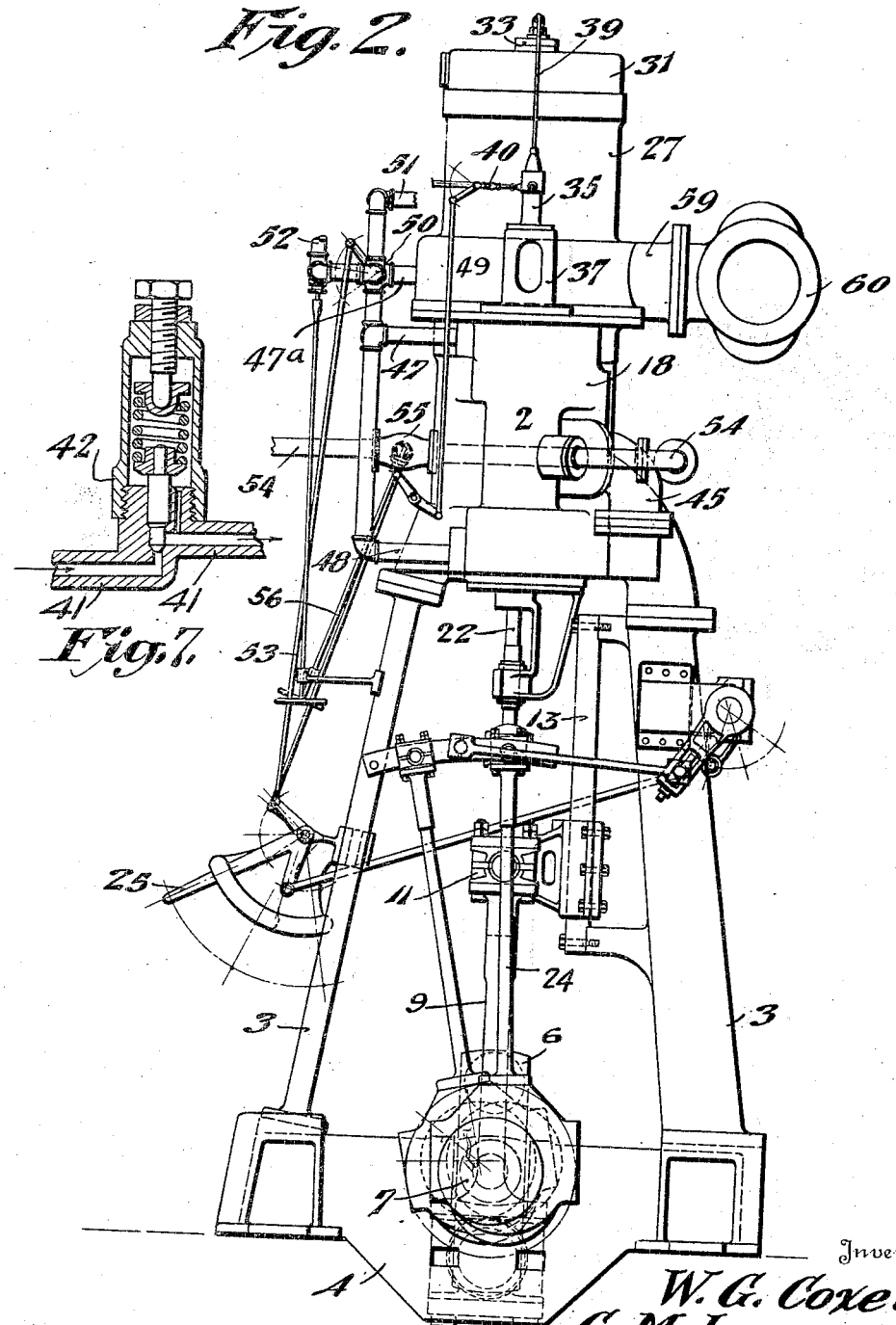

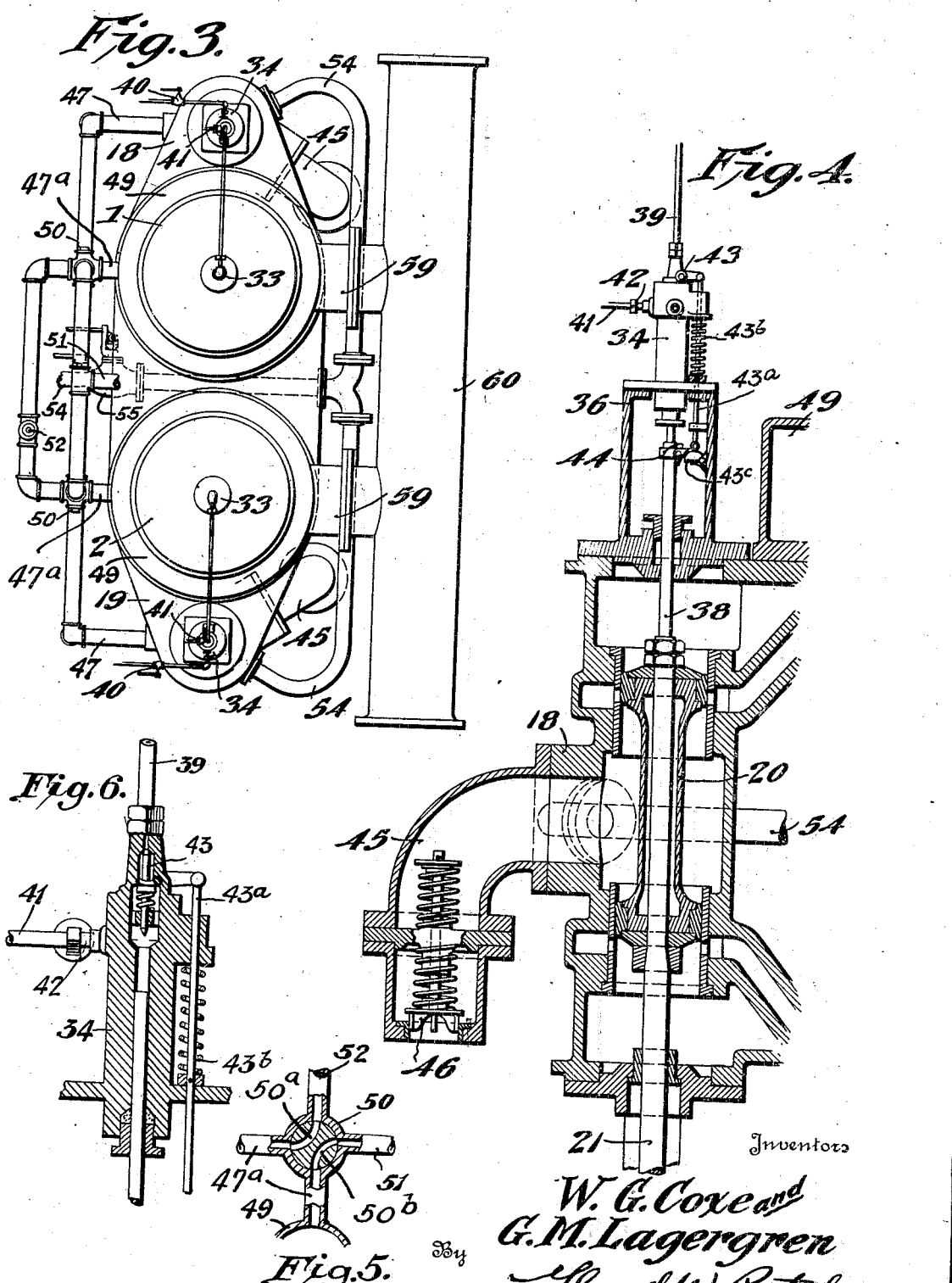

1,852,932

UNITED STATES PATENT OFFICE

GUSTAV M. LAGERGREN AND WILLIAM GRISCOM COXE, OF WILMINGTON, DELAWARE; HELEN BAER COXE EXECUTRIX OF SAID WILLIAM GRISCOM COXE, DECEASED

INTERNAL COMBUSTION ENGINE

Application filed March 17, 1924. Serial No. 699,890.

This invention relates to an improvement in internal combustion engines, particularly to the oil burning Diesel type, and is directed to the provision of an improved construction and design of such engines adapted to promote economy in manufacture and installation, efficiency and facility in operation and maintenance, and reliable in performance.

The primary object of this invention is to provide an improved engine structure operating with moderate compression and upon solid injection of fuel oil, without the necessity of maintaining an external supply of high pressure air, and one which can be started, operated and maneuvered or controlled, with the aid of low pressure air, or with steam.

A further object of our invention is to so construct and arrange the stationary and moving parts that the operating and control portions are under the direct observation of the operating engineer in charge and are readily accessible for adjustment, repair and replacement.

A still further object lies in providing a type of internal combustion engine mechanism which can be readily applied to and used in conjunction with standard parts of an ordinary reciprocating steam engine, for converting said steam engine into an internal combustion or Diesel type of engine, without radical changes in the installation and control of the existing power plant.

With the above and other objects in view which will be apparent to those skilled in the art, this invention includes certain novel features of construction and combinations of parts which will be hereinafter described and claimed.

In the drawings:

Figure 1 is a view in front elevation showing the general arrangement of the engine and with one of the cylinders and associated parts in section to more clearly illustrate the construction and mounting of the parts.

Fig. 2 is an end elevation of the engine showing the arrangement of the operating and control mechanisms.

Fig. 3 is a plan view of the engine showing the relative positions of intake and exhaust valves and manifolds, as well as the connection of fuel pipes and steam and air lines.

Fig. 4 is a vertical sectional view through the steam chest and oil pump support. Fig. 5 is a fragmentary sectional view to better show the air supply and steam exhaust control. Fig. 6 is a sectional view through the fuel oil pump and control valve.

Fig. 7 is a fragmentary sectional view to show one form of adjustable overflow valve that might be used.

In shipping circles there is a tendency toward extended installation and use of Diesel power, and it is often desired to make such an installation on board a steamship where a complete steam plant is at hand. Such a conversion ordinarily requires a complete tearing out of the steam propelling engine and boilers and a replacement of steam winches and other auxiliaries with electrically operated auxiliaries, thus making the conversion cost practically prohibitive. It is a purpose of our invention that the necessary portions for the Diesel conversion can be applied to the steam propelling engine forming a part of the complete steam plant, and that sufficient boiler capacity can be retained to give the desired steam supply for starting and maneuvering the Diesel propeller engine and for operation of the steam operated auxiliaries. In this way it is possible to materially decrease the cost of converting a steamer from steam power to a Diesel propelled vessel.

In the drawings we have illustrated a standard type of vertically reciprocating steam engine, such as is now installed in many steam propelled vessels, and this engine is shown as of the two cylinder type. The engine cylinders 1 and 2 are supported by the usual standards 3 upon the bed 4. The cranks 5 and 6 of the engine shaft 7 have the connecting rods 8 and 9 fitted on the wrist pins thereof, and at their upper ends these rods 8 and 9 are connected with the cross heads 10 and 11 mounted for vertical reciprocatory movement in suitable slide bearings 12 and 13.

Piston rods 14 and 15 are connected with the cross heads 10 and 11 and extend through suitable packing glands 16 in the lower heads 17 of the cylinders 1 and 2. Steam chests 18 and 19 are provided on the cylinders 1 and 2, and the usual slide valves 20 are mounted in these chests to control the intake and exhaust to and from the cylinders. The valves 20 are carried by stems 21 and 22, which have connecting rods 23 and 24 pivotally connected therewith, these connecting rods being mounted on suitable eccentrics on the engine shaft 7. The parts as above described are of substantially standard construction, and are here particularly mentioned only so that the relation and mounting of our improved structure may be better set forth, and the usual steam engine control mechanism is connected with these parts, as shown in Fig. 2, the usual control and operating handle being provided for manipulation by the engineer.

In associating our improved structure with the standard parts and mechanism, we remove the upper heads of the cylinders 1 and 2 and the steam chests 18 and 19, and extend the piston rods 14 and 15 and valve stems 21 and 22. In the open head ends of the cylinders, the combustion cylinders 26 and 27 are mounted, these cylinders being held in place by the usual cap screws, or by any other suitable fastenings. The combustion cylinders have the bore thereof reduced to the proper size for the strength of the engine shaft 7. The combustion cylinders 26 and 27 have pistons 28 mounted therein on the extensions of the piston rods 14 and 15, to be on the upper sides of the steam pistons 29, in the steam cylinders 1 and 2, these pistons 28 being of less diameter than the pistons 29 by reason of the reduction in the bore of cylinders 26 and 27. Water jacket cylinder heads 30 and 31 are secured to close the open tops of combustion cylinders 26 and 27, and it is perhaps preferable that the pistons 28 be provided with removable and replaceable heads 32, held in place by the use of dowel screws or other suitable fastenings, as the oil is forced into the combustion cylinders in direct contact with these piston heads through spray valves 33.

Oil pumps 34 and 35 of any desired type are mounted on standards 36 and 37, which cap and close the open tops of the steam chests 18 and 19, and extensions 38 of the valve stems 21 and 22 are adapted to operate these oil pumps. Oil pipes 39 extend from the oil pumps 34 and 35 to the oil spray valves 33, these pipes being preferably coiled or looped to provide for expansion due to the pressure of oil from the pump. The supply of oil to the pumps is turned on and off through valves 40 operated by the control handle 25, and an overflow pipe 41 has an adjustable overflow or blow-off valve 42 therein to be set to adjust the pressure at which oil is injected. One form of such a valve 42 as might be used in this connection is shown in Fig. 7, and it will be understood that the discharge end of the pipe 41 might be connected with a reserve tank, or with any suitable or convenient receptacle, or that this pipe 41 beyond the overflow valve 42 might discharge into the atmosphere. An injection control valve 43 is operated by a trip 44 on the valve stem extension 38, and thus the valve 43 is opened at the proper interval for the fuel oil injection. The pumps 34 and 35, which are of the construction shown in Fig. 6, or of any other desired type, are operated to pump oil on the upstroke of stems 21, and valves 43 controlling the supply of oil are opened by stems $43^a$. A spring $43^b$ on each stem $43^a$ causes the stem $43^a$ to bear at its lower end against a cam finger $43^c$, which is moved up by the trip 44 carried by stem 38 to raise stem $43^a$ against the pressure of spring $43^b$, and consequently open valve 43. The valves 43 can be of the form illustrated in Fig. 6, or of any other suitable type.

On the sides of the steam chests we provide atmospheric air intake pipes 45 having spring-closed suction intake valves 46 and air pipes 47 and 48 lead from the upper and lower ends of the steam chest through pipe $47a$ to an air chamber 49 which encircles the combustion cylinder to preheat air received from the steam chests. A four-way valve 50 is provided in the pipe $47a$ leading to the air chamber 49, and a pipe 51 leading from any suitable source of compressed air supply is connected with this valve 50, a steam exhaust pipe 52 being also connected with the valve. A steam pipe 54 leads to the steam chests and is controlled by a valve 55, operated by rod 56 having a hand wheel thereon.

Intake ports 57 lead from the air chambers 49 to the combustion chambers of cylinders 26 and 27, at a point above the heads of the pistons 28 on their lower stroke, and exhaust ports 58 are provided through the walls of the cylinders 26 and 27 and open into pipes 59, which connect with the exhaust manifold 60.

In starting, engine valve 50 is set in substantially the relation shown in Figure 5 and valve 55 is open to admit steam to the steam chest 18. The control levers are then set for either forward or reverse operation of the steam engine and the pistons in the Diesel cylinders will be reciprocated with the steam pistons 29. Valve 50 connects air supply pipe 51 with the chamber 49, and as oil is pumped and is supplied to the combustion chambers by actuation of the steam valves the Diesel units will operate. The oil supply can be cut off to permit operation entirely by steam, and the engine can be operated entirely as a Diesel engine, with the steam supply valve 55 closed.

In this setting of the parts the operation can be continued by the use of steam as long as valve 50 is in the setting illustrated, and steam is supplied through pipe 54. The exhaust of steam is through pipe 47a and passage 50a of valve 50 to steam exhaust pipe 52. In this setting, passage 50b of valve 50 establishes communication from compressed air supply pipe 51 to air chamber 49 and compressed air is supplied for operation of the Diesel unit, as long as the valve in the oil supply line is open. Closing of the steam supply valve will permit operation as a combustion engine and if the oil supply be cut off, the engine can be operated upon steam alone.

After the engine has been placed in operation valve 50 can be shifted to bring either passage 50a or 50b to establish direct communication through the two leads of pipe 47a, as illustrated in Fig. 5, and then a direct connection is established from the steam chest through pipes 47 and 48. As the steam pistons 29 move within the steam cylinders suction will be created to draw atmospheric air into the steam chest through the pipe 45, and this air will be sucked into the opposite ends of the steam cylinder to be compressed therein. The steam pistons 29 act as pump pistons to compress air which is passed through pipes 47 and 48 and through valve 50 to be discharged into the air chamber 49.

As this air chamber 49 surrounds the exhaust, the air will be preheated and in its compressed preheated state will be injected through intake ports 57 at the proper cycle interval. During the operation as above set forth, the supply of compressed air through pipe 51 will not be used.

While we have herein shown and described our invention associated and adapted to a particular type of steam power plant and particular control means therefor, it will be appreciated that changes and variations can be made in the form, construction, arrangement and mounting of the various parts, without departing from the spirit and scope of this invention.

We claim:

1. With a reciprocating steam marine engine structure comprising a steam cylinder having a rod carried piston therein and a stem operated reciprocating steam supply distributing valve, the combination of a combustion cylinder carried by the steam cylinder, a piston carried by the steam piston and working within the combustion cylinder, an atmospheric air intake pipe leading to said steam valve, an air intake valve in said pipe, a pipe leading from said steam valve to the interior of the combustion cylinder, a valve for said air supply pipe, a reciprocating oil supply pump, an operating means connecting the reciprocating valve to the oil supply pump, and a control valve actuated by movement of the steam supply distributing valve stem to control periodic injections of oil into the combustion cylinder.

2. With a reciprocating steam marine engine structure, comprising a steam cylinder having a rod carried piston therein with a stem operated reciprocating steam distributing valve, the combination of an air inlet connection to the steam chest, extensions on the piston rod and valve stem, an internal combustion cylinder mounted in line with the steam cylinder, a piston carried by the extension of the piston rod of the head end of the steam piston to work within the combustion cylinder, an oil pump carried by the steam chest to be operated from the extension of the valve rod, a pipe from the steam chest to the combustion cylinder, a charge supply connection to the combustion cylinder, a pipe leading from the oil pump to the charge supply connection, and a valve in said pipe operated by movement of the extension on the valve stem to open the oil pipe for periodic injections of oil through the charge supply connection.

3. With a reciprocating steam marine engine structure, comprising a steam cylinder having a rod carried piston therein with a stem operated reciprocating steam distributing valve, the combination of extensions on the piston rod and valve stem, an internal combustion cylinder mounted on the open head end of and in line with the steam cylinder, a piston carried by the extension of the piston rod on the head end of the steam piston to work within said combustion cylinder, an oil pump carried by the steam valve chest to be operated from the extension on the valve stem, a pipe from the steam valve chest to the combustion cylinder to supply charge forming air to said cylinder, a charge supply connection to the combustion cylinder, a pipe leading from the oil pump to the charge supply connection, a valve in said pipe operated by movement of the extension on the valve stem to open the oil pipe for periodic injections of oil, a steam connection to the steam valve, and an exhaust connection from said combustion cylinder.

4. With a reciprocating steam marine engine structure, comprising a steam cylinder having a rod carried piston therein with a stem operated reciprocating steam distributing valve, the combination of a combustion cylinder of less diameter than the steam cylinder mounted on the open head end of said steam cylinder in axial alinement therewith, a piston mounted on and reciprocating with the steam piston working within the combustion cylinder, a valve controlled air inlet for the combustion chamber, an oil injection pump mounted on the steam valve chest, an operating means from the reciprocating valve to said pump, a connection from said pump to the interior of the combustion cylinder, a charge control valve associated with said pump and actuated by movement of the reciprocating steam chest controlling valve to open connection to the combustion cylinder for periodic injections of oil thereinto, and an exhaust connection from the combustion cylinder.

5. With a reciprocating steam marine engine structure comprising a steam cylinder having a rod carried piston therein and a stem operated reciprocating steam distributing valve, the combination of a Diesel engine structure comprising an internal combustion cylinder mounted on the open head end of said stem cylinder in axial alinement therewith, an extension on the steam piston rod extending into the combustion cylinder, a piston carried by the extension of the piston rod movable within the combustion cylinder, and fuel supply means connecting with said combustion cylinder and connected to be actuated by the steam valve stem.

In testimony whereof we hereunto affix our signatures.

WILLIAM GRISCOM COXE.
GUSTAV M. LAGERGREN.